Patented July 10, 1945

2,379,855

UNITED STATES PATENT OFFICE 2,379,855

FLUIDS FOR FLUID PRESSURE SYSTEMS

Charles E. Allderdice, Jr., Chicago, Ill., assignor to The Bell Co., Inc., Chicago, Ill., a corporation of Illinois No Drawing. Application December 24, 1943, Serial No. 515,587

4 Claims. (Cl. 252—76)

My invention relates to a fluid for use in operating and controlling fluid pressure systems, such as hydraulic brake systems, hydraulic shock absorbers, general hydraulic systems for airplanes, jacks, lifts and other constructions.

Among the objects of my invention is to provide fluids for fluid pressure systems having an extremely high boiling point so that systems using them may be able to operate normally in the excessive temperatures found in the Sahara Desert and other hot places in the world.

In addition, my fluids also have extremely low pour points, so that system using them may operate satisfactorily in the low temperatures of Siberia, the Arctic, the Antarctic and other cold places.

My fluids having both extremely high boiling points and extremely low pour points, may be used in systems shifted quickly from one temperature extreme to another, without the liquids in the systems being changed. This often takes place in airplanes passing from the sub-zero temperatures of the stratosphere to the extremely hot surface temperatures of the equatorial tropics.

In the normal operating temperatures and in the extremely high and low temperatures found on earth, my fluids retain an operable viscosity. In extreme heat my fluids retain sufficient thickness of body to prevent their leaking past the pistons and losing hydraulic pressure. With my fluids there is no boiling at high earthly temperatures so as to cause vapor lock in the systems. Even extreme cold does not so thicken my fluids that they stop flowing or flow too slowly to properly operate the hydraulic systems.

In addition my fluids have a negligible effect on the rubber parts of a hydraulic system. There is limited ingestion of my solutions by the rubber parts, so that swelling of the rubber parts is held to a minimum and there is no practical danger to the rubber parts nor interference with the operation of the system.

My fluids do not corrode any of the metal parts of a fluid pressure system, and in fact, act as a lubricant for the moving parts of the system.

There is often some water in fluid pressure systems which has condensed from the atmosphere. My fluids will absorb this water into the solution. This solves the problem of the otherwise free water corroding and rusting the metal parts of the system, or in cold temperatures, freezing and blocking the entire system.

My fluids have a high flash point, it being in excess of 145° F., when tested in the Cleveland open cup flash tester, and are therefore safe from combustion in ordinary handling, transit and storage throughout the highest known temperatures of the earth.

My invention also contemplates such other objects, advantages and capabilities as will later more fully appear and which are inherently possessed by my invention.

While I have disclosed herein certain preferred embodiments of my invention, yet I wish it understood that the same are susceptible of modification and change without departing from the spirit of my invention.

The preferred form of my fluid selected to illustrate my invention consists of a solution of castor oil, amyl alcohols ($C_5H_{11}OH$) and diethylene glycol monoethyl ether

($C_2H_5OCH_2CH_2OCH_2CH_2OH$)

with an acid neutralizer such as potassium hydroxide dissolved therein.

I may use instead of potassium hydroxide an acid neutralizer taken from any desirable group of alkaline compounds, including the organic amines and suitable inorganic compounds.

This solution has desired body and lubrication value. It has necessary water tolerance, is not corrosive to metal, does not harmfully swell rubber parts, has a high flash point (above 145° F.), and can be safely handled, transported and stored. This solution has both an extremely high boiling point (above 300° F.) and extremely low pour point (below −80° F.).

Referring again to my preferred solution, I have found that the fluid formed from the following proportions by volume is extremely efficacious: 20% of castor oil; 20% of amyl alcohols and 60% of diethylene glycol monoethyl ether, with a sufficient amount of potassium hydroxide or other acid neutralizer added to and dissolved in the above solution to render the solution free of organic acids, and neutralize the same. The solution will then be free from corrosive action on the metal parts of a system in which it is used.

Another form of my fluids consists of the addition to the foregoing fluid of ethylene glycol monobutyl ether ($C_4H_9OCH_2CH_2OH$).

When my fluid also contains ethylene glycol monobutyl ether I prefer to use 20% of the same, with 20% castor oil, 20% amyl alcohols and 40% diethylene glycol monoethyl ether, with the desired amount of acid neutralizer dissolved therein.

In place of castor oil in my fluids, I may use any oil which has a low solidifying point, stability at higher temperatures and inertness toward rubber.

Having thus described my invention, I claim:

1. A fluid for fluid pressure systems consisting of substantially the following proportions by volume: 20% castor oil, 20% amyl alcohols and 60% diethylene glycol monoethyl ether and an acid neutralizer.

2. A fluid for fluid pressure systems consisting of substantially the following proportions by volume: 20% castor oil, 20% amyl alcohols, 20% ethylene glycol monobutyl ether, and 40% diethylene glycol monoethyl ether and an acid neutralizer.

3. In a fluid pressure system, fluid having a boiling point exceeding 300° F., a pour point below —80° F., and water tolerance in excess of 3½%, said fluid consisting of substantially the following proportions by volume: 20% of an oil characterized by a low solidifying point, stability at a high temperature and inertness to rubber, 20% amyl alcohols and 60% diethylene glycol monoethyl ether and an acid neutralizer.

4. In a fluid pressure system, a fluid having a boiling point exceeding 300° F., a pour point below —80° F., and water tolerance in excess of 3½%, said fluid consisting of substantially the following proportions by volume: 20% of an oil characterized by a low solidifying point, stability at high temperature and inertness to rubber, 20% amyl alcohols and 60% selected from the class consisting of diethylene glycol monoethyl ether and ethylene glycol monobutyl ether, and an acid neutralizer.

CHARLES E. ALLDERDICE, Jr.